(12) United States Patent
Armstrong et al.

(10) Patent No.: US 6,454,015 B1
(45) Date of Patent: Sep. 24, 2002

(54) SHEARING GATE VALVE

(75) Inventors: John Taylor Armstrong, Banchory (GB); Ian Gourlay, Bridge of Don (GB); Peter Kent, Inverurie (GB); Chau Hoang, Houston, TX (US)

(73) Assignee: ABB Vetco Gray Inc., Houston, TX (US)

( * ) Notice: Subject to any disclaimer, the term of this patent is extended or adjusted under 35 U.S.C. 154(b) by 0 days.

(21) Appl. No.: 09/610,392

(22) Filed: Jul. 5, 2000

Related U.S. Application Data (60) Provisional application No. 60/143,858, filed on Jul. 15, 1999.

(51) Int. Cl.$^7$ .................. E21B 33/06; E21B 34/02
(52) U.S. Cl. .................. 166/387; 166/373; 166/85.4; 166/86.3
(58) Field of Search .................. 166/55, 55.1, 55.2, 166/373, 383, 296, 387, 85.4, 86.1, 36.3, 316

(56) References Cited

U.S. PATENT DOCUMENTS

| | | | | |
|---|---|---|---|---|
| 3,273,855 A | * | 9/1966 | Wells | 251/328 |
| 4,132,267 A | | 1/1979 | Jones | |
| 4,192,483 A | * | 3/1980 | Combes | 251/172 |
| 4,215,749 A | | 8/1980 | Dare et al. | 166/361 |
| 4,341,264 A | | 7/1982 | Cox et al. | |
| 4,349,175 A | * | 9/1982 | Akkerman et al. | 251/31 |
| 4,523,639 A | * | 6/1985 | Howard, Jr. | 166/55 |
| 4,580,626 A | | 4/1986 | Jones | |
| 4,612,983 A | | 9/1986 | Karr, Jr. | 166/55 |
| 4,671,312 A | | 6/1987 | Bruton | 137/315 |
| 4,741,509 A | * | 5/1988 | Bunch et al. | 251/172 |
| 4,911,410 A | * | 3/1990 | Baker | 251/327 |
| 4,971,098 A | * | 11/1990 | Stroud | 137/246.12 |
| 4,997,162 A | * | 3/1991 | Baker et al. | 251/327 |
| 5,163,655 A | * | 11/1992 | Chickering, III et al. | 251/174 |
| 5,370,362 A | | 12/1994 | Kent et al. | |
| 5,501,424 A | * | 3/1996 | Williams et al. | 251/1.3 |
| 5,803,431 A | * | 9/1998 | Hoang et al. | 251/327 |
| 6,244,336 B1 | * | 6/2001 | Kachich | 166/55 |

FOREIGN PATENT DOCUMENTS

| | | | | |
|---|---|---|---|---|
| EP | 0 416 719 A1 | | 3/1991 | E21B/29/04 |
| EP | 0417877 A1 | * | 3/1991 | E21B/29/04 |

* cited by examiner

*Primary Examiner*—David Bagnell
*Assistant Examiner*—Jennifer H Gay
(74) *Attorney, Agent, or Firm*—Bracewell & Patterson, L.L.P.

(57) ABSTRACT

A gate valve has downstream shear and seal capabilities in which the gate will stroke far enough to cover the downstream seat interface, and has a single shearing surface for shearing of a wireline. The gate has an inlay of a hard ductile material such as Stellite® along the shearing edge of the gate. The gate also has a coating of an extremely hard material such as tungsten carbide on the sealing surface of the gate. The seat also has an inlay of a hard ductile material such as Stellite® along its shearing edge. The gate fully covers and seals the upstream seat interface after the shear media has fallen below the upstream gate/seat interface. An upstream lip seal for the upstream seat ring is energized to seal on upstream pressure.

6 Claims, 6 Drawing Sheets

SHEARING GATE VALVE

This application claims the benefit of U.S. provisional application Serial No. 60/143,858, filed Jul. 15, 1999.

TECHNICAL FIELD

This invention relates in general to gate valves, and in particular to a gate valve having an asymmetrical gate that allows shearing of a wireline while maintaining post-shear seal integrity.

BACKGROUND ART

In the prior art, two types of coatings are generally used on valve gates. Some gates are coated with a layer of very hard material such as a carbide material. A coating of very hard material offers great durability. However, use of this type of coating on gates that are used to shear a wireline is not recommended. A coating of very hard material is generally brittle, thereby being inherently subject to chipping. Also, this type of coating is generally thin, averaging between 0.003 inches and 0.005 inches, and incapable of holding an edge while cutting. Furthermore, since this coating is not metallurgically bonded to the substrate material, high shear stresses that arise at the coating-substrate interface promote cracking of the coating. Cracking or chipping of the coating is not desirable because it reduces sealing efficiency, thereby requiring replacement of the gate more frequently.

Since coatings of very hard materials, such as carbides, are not ideal for wireline cutting applications, wireline shearing gates have been typically hardfaced with a second type of coating. The type of coating that is more suitable for wireline cutting operations is a hard ductile material such as Stellite® or Colmonoy® to provide protection against chipping when used for shearing. However, sometimes it is difficult to coat larger areas with these materials without cracking of the coating. Also, such ductile materials have markedly inferior wear characteristics compared to carbides and are easily scratched or otherwise damaged.

Because of the above problem with coating or hardfacing gates with either only an extremely hard material or only a more ductile material, prior art gate valves have not been suited for shearing wireline while retaining post-shear seal integrity.

Also, prior art seat seals have used PTFE (Polytetrafluoroethylene) jackets energized with a stand off ring that inserts within an opening in the seat seals. The openings in the seat seals have traditionally faced towards the gate of the gate valve. A problem with this configuration is that while pressure acting on the downstream seal acts to force the seal open, thereby energizing the seal, pressure on the upstream side of the gate acts to compress the seal, which results in leakage around the seal.

SUMMARY OF THE INVENTION

In this invention, the single shear gate of a gate valve is coated with a combination of materials to achieve a gate capable of shearing wireline while retaining seal integrity. The asymmetrical gate allows for shearing wireline in a single location, thereby eliminating a slug of shearable material. Since ductility is desired at the shearing edge of the gate, and extreme hardness is desired at the sealing surfaces of the gate, this invention strategically locates materials having appropriate characteristics.

The shearing edge is constructed of an inlay of a hard ductile material that provides protection against chipping. The sealing surfaces, on the other hand, are coated with an extremely hard material that provides durability to the sealing surface. Extremely hard sealing materials are very brittle and may crack and chip if subjected to the high shearing stresses encountered during shearing. However, cracking and chipping is prevented by providing inlays of a more ductile material located at the shearing edges that isolate the brittle sealing material from the majority of the shearing stresses.

Valve seats surrounding the gate of the gate valve have seals provided to seal between the valve seat and the valve body. The seals are energized with a standoff ring. The upstream seal is reversed from the traditional orientation such that the standoff ring engages the valve body and the seal opening faces upstream, which results in pressure energizing the seal, thereby preventing leakage.

BRIEF DESCRIPTION OF THE DRAWINGS

The novel features believed characteristic of the invention are set forth in the appended claims. The invention itself however, as well as a preferred mode of use, and further objects and advantages thereof, will best be understood by reference to the following detailed description of an illustrative embodiment when read in conjunction with the accompanying drawings, wherein:

DETAILED DESCRIPTION OF THE INVENTION

Figure 1:
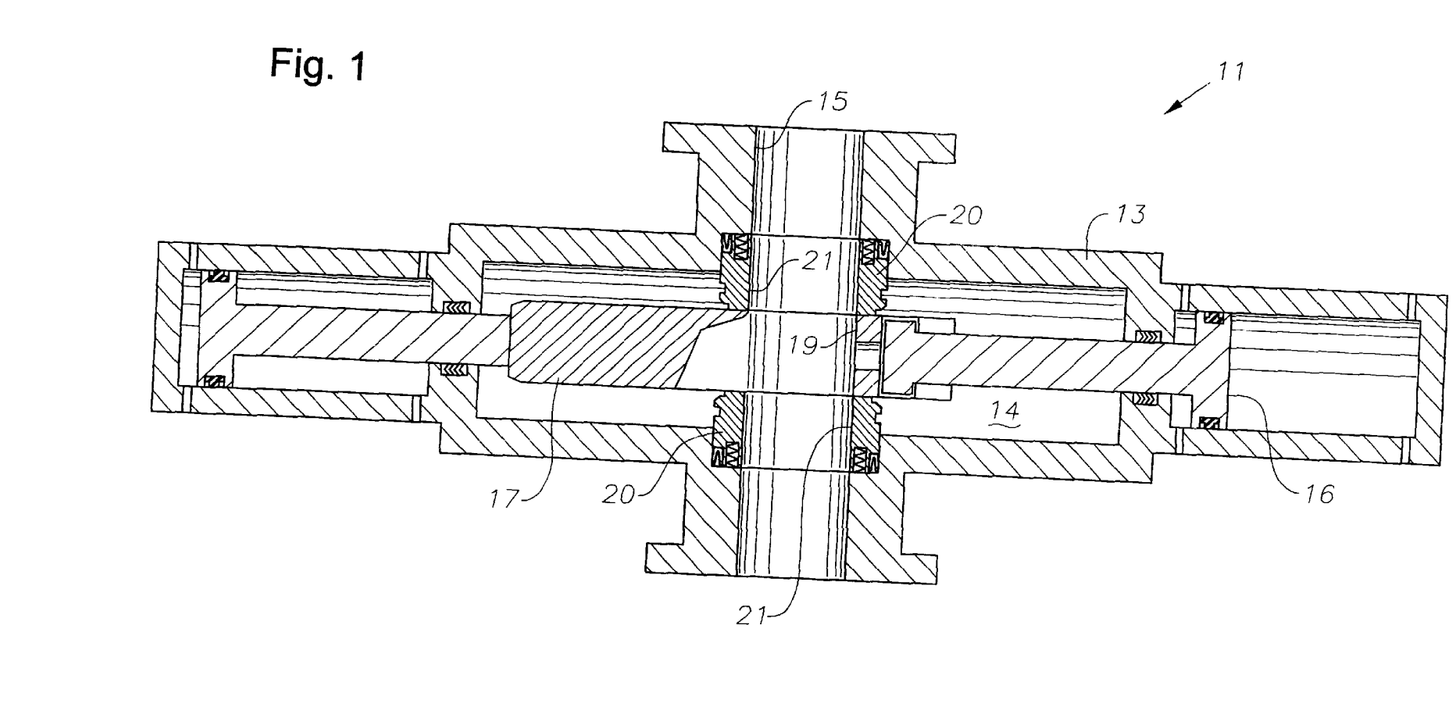
FIG. 1 is a sectional view illustrating a typical gate valve that also has features constructed in accordance with this invention.

Referring to FIG. 1, valve 11 is a standard gate valve except for features in accordance with this invention. Valve 11 has a body 13, and a flow passage 15 that extends transversely through body 13. Valve 11 has a gate 17 with a hole 19 therethrough. Gate 17 is located in a sealed chamber 14 in body 13 and is shown in the open position in FIG. 1. Actuator pistons 16 connect to opposite ends of gate 17 to stroke gate 17 between its open and closed positions. Alternatively, a threaded rod may be used to move the gate. Also shown in FIG. 1 are ring-shaped valve seats 20 mounted in body 13, which have holes 21 that register with the flow passage 15 of the valve.

When gate 17 is in the open position (FIG. 2), the hole 19 of gate 17 registers with flow passage 15 of the valve 11 thereby allowing flow through the valve. When gate 17 is closed (FIG. 3), hole 19 no longer registers with the flow passage 15. Instead, the solid portion of gate 17 registers with the flow passage 15 and comes into contact with seats 20.

Figure 2:
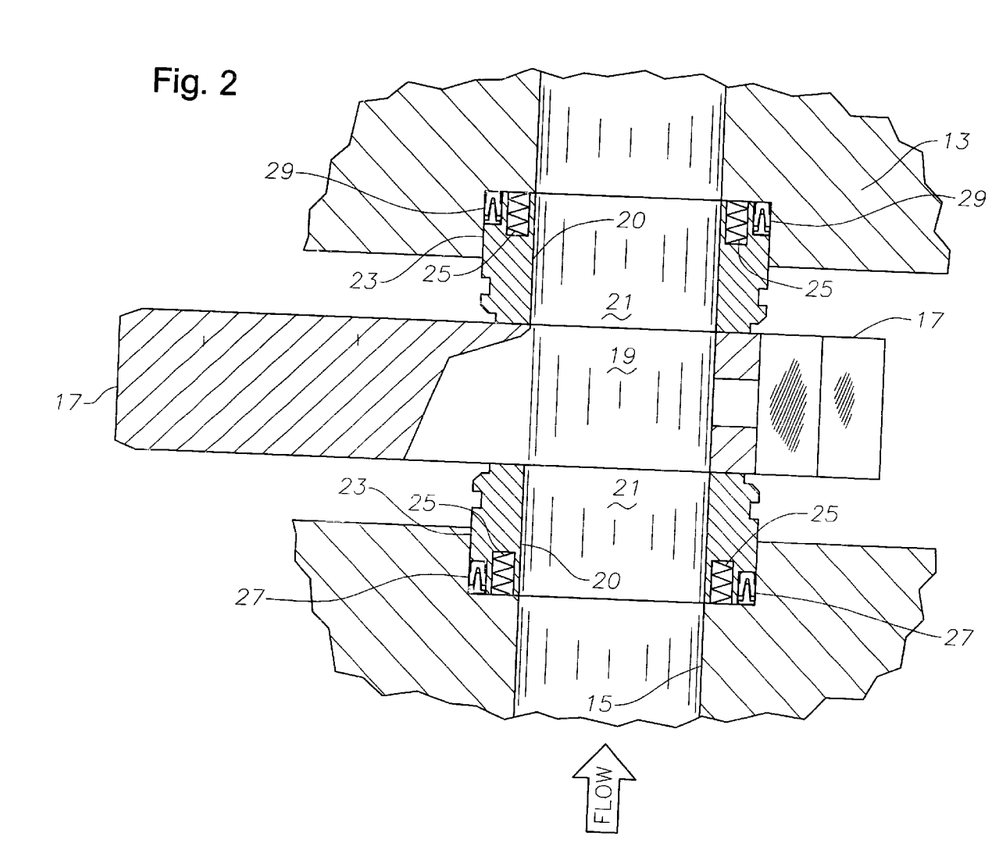
FIG. 2 is an enlarged view of the gate and seat portion of FIG. 1, showing the gate in an open position.
Figure 2A:
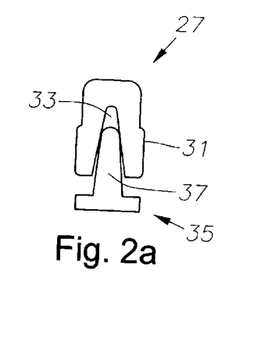
FIG. 2a is an enlarged view of the upstream seat seal of FIG. 2.
Figure 2B:
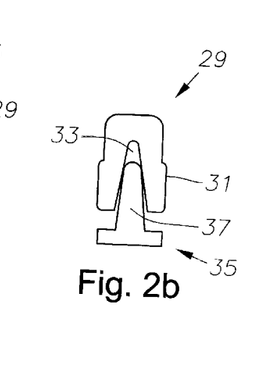
FIG. 2b is an enlarged view of the downstream seat seal of FIG. 2.
Figure 3:
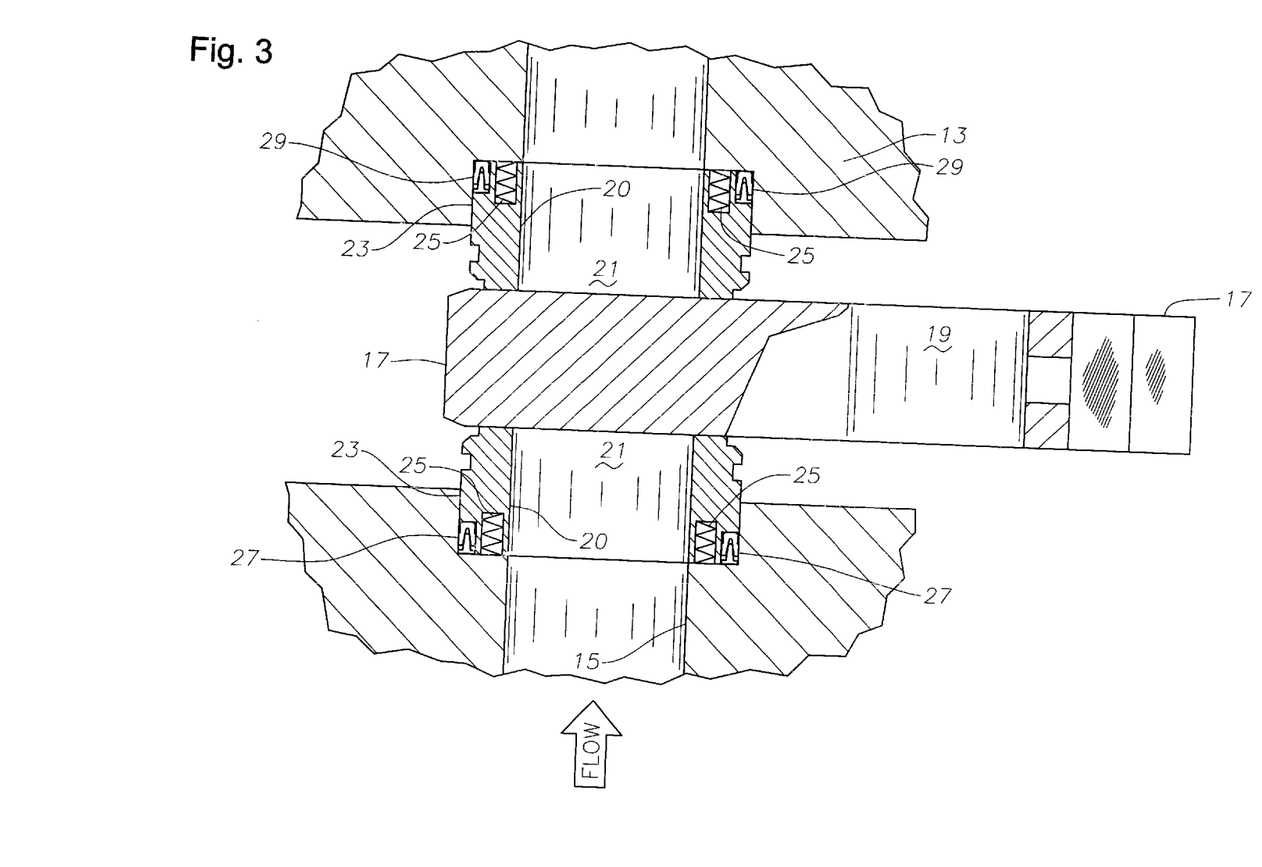
FIG. 3 is an enlarged view of the gate and seat portion of FIG. 1, showing the gate in a closed position.

Referring to FIGS. 2 and 3, seat 20 rests in recess 23 formed in valve body 13. Each seat 20 is biased towards gate 17 by seat springs 25. Upstream seals 27 and downstream seals 29 prevent leakage around valve seats 20. As shown in FIGS. 2a and 2b, each seal 27, 29 is an elastomeric ring 31 having an annular cavity 33. Elastomeric ring 31 is preferably constructed of PTFE. A standoff ring 35 has a protruding rim 37 that inserts within cavity 33 to energize seal 27, 29. Protruding rim 37 of standoff ring 35 engages cavity 33, which forces elastomeric ring 31 to expand, thereby effecting an improved seal. The downstream seal 29 on the downstream side of gate 17 (FIG. 2b) is oriented such that pressure leaking around downstream seat 20 energizes the seal 29 and causes it to expand. Standoff ring 35 is thus on the upstream side of downstream seal 29 with its head in abutment with downstream seat ring 20. The end of elastomeric ring 31 of downstream seal 29 that is opposite the cavity 33 abuts a shoulder in body 13. Similarly, the elastomeric ring of upstream seal 27 on the upstream side of gate 17 (FIG. 2a) is oriented such that pressure leaking around seat 20 energizes upstream seal 27 and causes it to expand. The head of standoff ring 35 in upstream seal 27 engages body 13. The end of elastomeric ring 31 of upstream seal 27 opposite cavity 33 engages a shoulder on seat ring 20.

Figure 4:
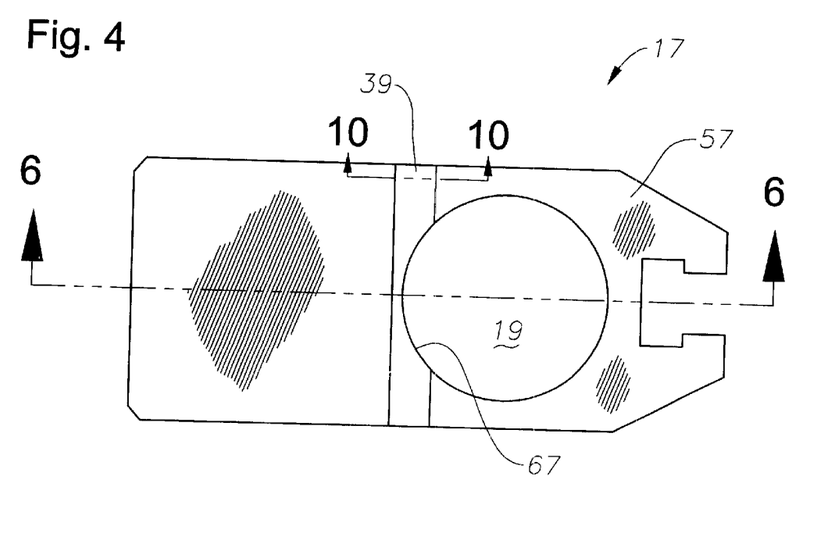
FIG. 4 is a top view of the gate of the gate valve of FIG. 1.

FIG. 4 shows gate 17 in more detail. The gate 17 shown in FIG. 4 is for a rising-stem type valve. According to this invention, gate 17 has an inlay 39 along its shearing edge. Inlay 39 is formed of a hard ductile material. The hardness is desirable to facilitate shearing of a wireline 41 (shown in FIG. 9). The harder the material, the better it will shear the wireline. However, extremely hard materials, such as carbides, are also very brittle. Brittleness is not desired because chipping occurs, thereby reducing the sealing capability of the gate. Some ductility is desirable because it prevents chipping. The preferred embodiment of the invention uses Stellite®. Stellite® is a hard ductile material. It is hard enough to allow shearing of the wireline, but is more ductile than carbide materials, thereby preventing chipping.

The inlay 39 of Stellite® is applied to gate 17 as shown in FIGS. 8A–8D. Before machining hole 19 (FIG. 4), a groove 43 (FIG. 8A) is machined into gate 17. The groove 43 extends straight from one side of gate 17 to the other side of gate 17 and intersects what will later become hole 19. Still referring to FIGS. 8A–8D, groove 43 has a bottom surface 45, and an inclined wall 47. Inclined wall 47 can be either perpendicular to bottom surface 45, thereby creating a 90-degree angle between the bottom surface 45 and the inclined wall 47, or it can be inclined at some other angle, such as the 45-degree angle shown in FIG. 8A. Groove 43 extends from one side of gate 17 to the other side of gate 17 for ease of manufacture. The groove 43 could have a different configuration as long as it allows a shearing edge to be formed around at least a portion of hole 19.

Figure 8A:
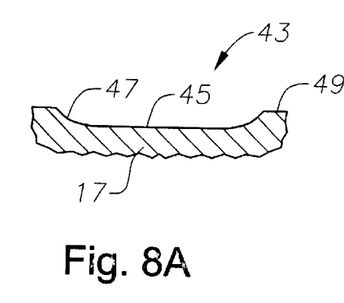
FIGS. 8A–8D are parts of a sectional view taken along the line 10—10 in FIG. 4 and showing the steps used in connecting the inlay to the gate.
Figure 8B:
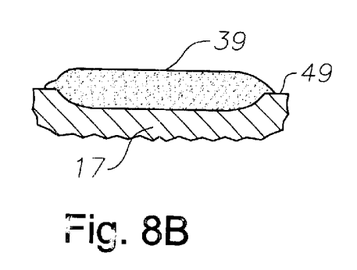

After groove 43 is machined into gate 17, groove 43 is welded full with Stellite® to form inlay 39. The welding process results in the Stellite® protruding above surface or face 49 of gate 17, as shown in FIG. 8B. Surface 49 is the surface which is later coated with the very hard material.

Figure 8C:
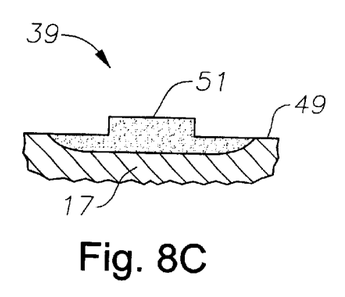
Figure 8D:
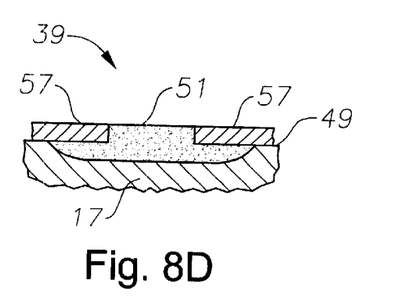

Referring now to FIG. 8C, the inlay 39 is ground down to leave a rectangular notch 51 of Stellite® protruding above surface 49. The Stellite® inlay material 39 around the rectangular notch 51 is ground down flush with the surface 49 of gate 17.

Figure 5:
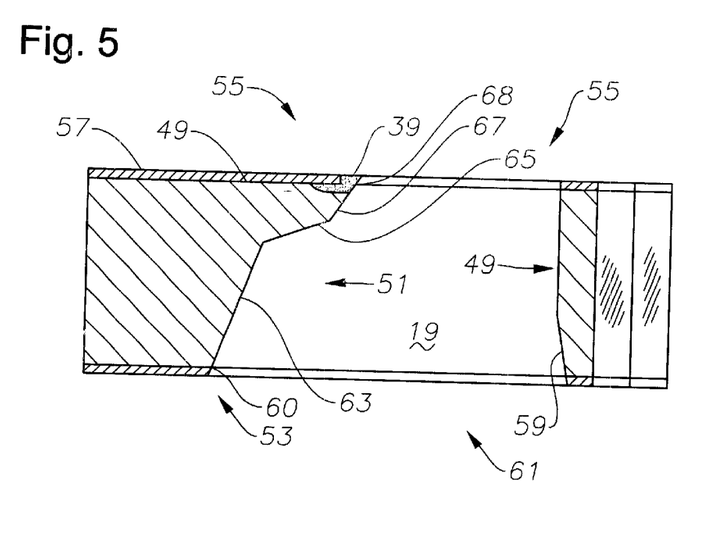
FIG. 5 is a sectional view of the gate shown in FIG. 4 taken along the line 6—6 in FIG. 4.

Before the extremely hard coatings are applied to the gate, hole 19 is machined into gate 17 as shown in FIG. 4. Gate 17 has an upstream side 53 and a downstream side 55 (FIG. 5). Downstream side 55 is preferably coated with a coating 57, which is a hard material such as tungsten carbide. Hole 19 in gate 17 is tapered such that the opening on the upstream side 53 is larger than the opening on the downstream side 55. The opening on the upstream side 53 is irregularly shaped. A taper 59 may be provided around a perimeter of the upper portion of upstream opening 61. Beginning at leading edge 60 of the upstream surface 53, the lower surface of hole 19 tapers upward and towards downstream side 55, forming first lower surface 63. The lower surface then tapers more steeply upwards, forming second lower surface 65. Second lower surface 65 terminates at third lower surface or shearing surface 67, which extends with a less steep upward slope to the downstream side 55 to form leading edge 68 of downstream side 55. The result is a single shearing surface 67. The single shearing surface 67 significantly reduces the force necessary to shear shearable media, such as wireline 41 (FIG. 9), as compared to gates having two shearing surfaces.

As can be seen in FIGS. 4 and 5, shearing surface 67 is coextensive with a portion of inlay 39. Once hole 19 has been machined and inlay 39 has been prepared as described above, surface 49 and the portions of inlay 39 that have been ground flush with surface 49 can be coated with an extremely hard material or coating 57 such as tungsten carbide, preferably having a thickness between 0.003 and 0.007". Coating 57 is deposited by a conventional high energy deposition technique such as Praxair's LW-45. The coating 57, deposited onto surface 49 and the portion of inlay 39 that is flush with surface 49, will form the sealing surface that will contact against seat 20. During opening and closing of the valve, coating 57 is subject to scratching and other damage which must be prevented if the seal integrity of the valve is to be preserved. Therefore, it is desirable for coating 57 to be very durable. Because tungsten carbide is an extremely hard material, it affords great durability. Portions of surface 49 that do not perform any sealing function need not be coated. In the case that portions of surface 49 are not coated, then these portions should be made to be flush with coating 57 on surface 49 and flush with the rectangular notch 51 of inlay 39.

The above process will result in the shearing surface 67 of hole 19 having reinforcements of Stellite® as shown in FIG. 5 along a portion of the circumference of hole 19 on the downstream side 55. Since only a portion of this circumference acts as a shearing edge, only that portion of the circumference needs to have the Stellite® shearing edge. However, the Stellite® shearing edge can extend completely around the circumference, if desired.

The above description discusses improvements only to the downstream side 55 of gate 17. Since only the downstream side 55 functions as the shearing surface, only one side of each gate 17 needs to be improved. The upstream side 53 need not be reinforced with Stellite®, since the upstream side 53 performs no shearing functions.

Figure 6:
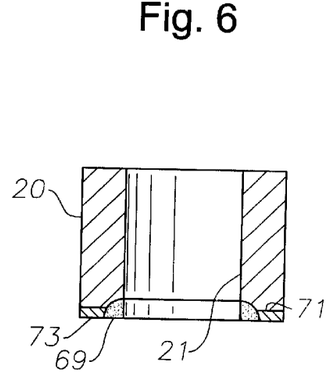
FIG. 6 is a sectional view of the seat shown in FIG. 2.

In the preferred embodiment of this invention, at least downstream seat 20 has an inlay 69 of a hard ductile material that forms a shearing edge (FIG. 6). The hardness is desirable to facilitate shearing of the wireline 41. The harder the material, the better it will shear the wireline 41. However, some of the very hard materials are also very brittle. Brittleness is not desired because chipping occurs thereby reducing the sealing capability of the seat 20. Some ductility is desirable because it prevents chipping. The preferred embodiment of the invention uses Stellite® for inlay 69.

In the preferred embodiment, inlay 69 is applied to seat 20 by a process similar to the process used for applying inlay 39 to gate 17. Referring to FIG. 6, a groove is machined into the circumference defined by the intersection of hole 21 and of sealing surface 71 of the seat 20. The Stellite® inlay 69 is then welded into the groove and machined to remove the excess portions of inlay 69. The remainder of surface 71 is then coated with a coating 73 of an extremely hard material such as tungsten carbide. The coating 73 is deposited so that coating 73 and the outward surface of the inlay 69 are flush, thereby providing a smooth sealing surface. Tungsten carbide is an extremely hard material that affords great durability. Since the coating 73 deposited onto surface 71 will form the sealing surface that will contact against the sealing surface of gate 17, this coating needs to be very durable to preserve the integrity of the seal. Tungsten carbide provides such durability.

Figure 7:
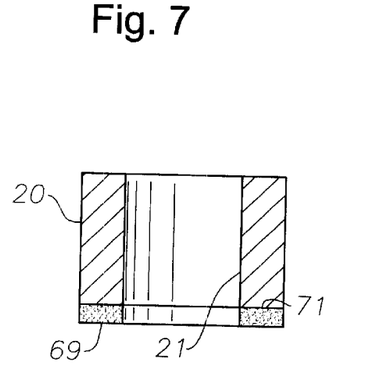
FIG. 7 is the same sectional view shown in FIG. 6, but showing a different arrangement of the inlay and the coating of the seat.

Although the seat described above has both Stellite® inlay 69 and tungsten carbide coating 73, it would also be feasible to use only a Stellite® inlay 69 that extends across the entire surface 71 of seat 20, as shown in FIG. 7.

The desired thicknesses in the preferred embodiment for inlays 39 and 69 and for coatings 57 and 73 are as follows. After grinding, the Stellite® inlays 39 and 69 should preferably be about 0.080 inches. However, thicknesses between 0.060 inches and 0.100 inches have also been found to be acceptable. Thicker inlays should also be theoretically acceptable, however, most of the processes used to apply the Stellite® to the gate limit the maximum thickness to about 0.100 inches. The preferable thickness of carbide coatings 57 and 73 is 0.005 inches. However, thicknesses between 0.003 inches and 0.006 inches have also been found to be acceptable.

As described above, the preferred embodiment uses Stellite® for inlays 39 and 69 and tungsten carbide for coatings 57 and 73. However, different materials, having similar characteristics could also be used. The following criteria should be used in selecting appropriate materials. The material used for coatings 57 and 73 should be a very hard, wear resistant material. The preferred embodiment uses tungsten carbide for coatings 57 and 73. The hardness of the tungsten carbide coatings of the preferred embodiment is in excess of 65 on the Rockwell C hardness scale. Such hardness is sufficient to provide a wear resistant sealing surface that is not easily scratched.

The material for inlays 39 and 69 should be hard material that is relatively ductile when compared to the material used for coatings 57 and 73. The material selected for inlays 39 and 69 must be sufficiently hard to allow shearing of wireline 41 extending through the valve 11, but must also be sufficiently ductile so that a small deformation will not cause fracture of the material. The preferred embodiment uses Stellite® for inlays 39 and 69. The hardness of the Stellite® used in the preferred embodiment is in the range of about 40 to 50 on the Rockwell C hardness scale. This hardness is sufficient to allow shearing of wireline 41. However, Stellite® was also selected for the preferred embodiment because it is relatively ductile when compared to the material used for coatings 57 and 73, and will not chip or fracture when subjected to the deformations caused during shearing of a wireline.

In operation, while in the open position shown in FIG. 2, upstream seat 20 will not seal against gate 17 because its diameter is less than the diameter of hole 19 on the upstream side. Flow pressure communicates to the chamber 14 of body 13 that contains gate 17. Seals 27, 29 and downstream seat 20 perform no sealing function while gate 17 is open. In the closed position shown in FIG. 3, the downstream side of gate 17 will seal against the downstream seat ring 23. The upstream seat ring 23 contacts the upstream side of gate 17, but not any portion of hole 19. Pressure in body chamber 14 will energize downstream seal 29, pressing the legs apart. Sealing also occurs on the upstream contact of the upstream seat ring with the solid surface of gate 17. Upstream seal 27 is energized by pressure in bore 15, which forces the legs apart to seal. Even if the downstream sealing surface of gate 17 or downstream seat ring 23 is damaged, the upstream side of gate 17 and upstream seat ring 23 will still seal to block flow through bore 15.

Figure 9:
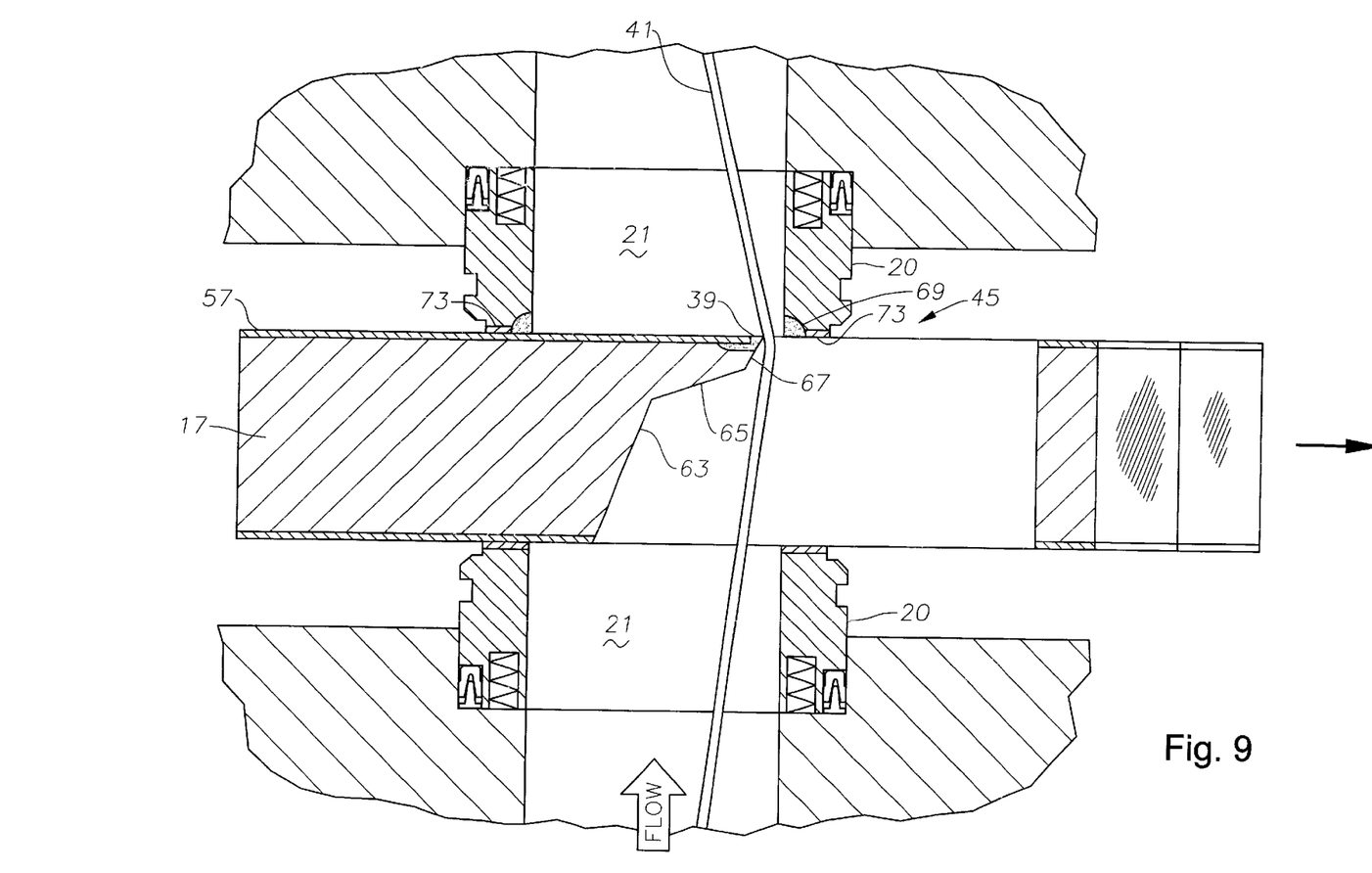
FIG. 9 is an enlarged view of the gate and seat portion of FIG. 1, showing the shearing of a wireline.

Referring now to FIG. 9, wireline 41 is shown extending through seats 20 and gate 17. Gate 17 is shown in a nearly closed position. If gate 17 were in its open position, the downstream opening of hole 19 would be aligned with the flow passages defined by holes 21 of seats 20. If gate 17 were in its closed position, then coating 57 would be completely obstructing the flow passage defined by holes 21. As shown in FIG. 9, gate 17 is moving from its open position to its closed position as indicated by the arrow.

As gate 17 continues its movement from the open position to the closed position, wireline 41 will eventually come into contact with inlay 39 on third lower surface 67 of gate 17 and with inlay 69 on downstream seat 20. As increasing force is applied to gate 17, there will be a shearing action between inlay 39 and inlay 69. This shearing action will result in the shearing of wireline 41. Once wireline 41 is sheared, gate 17 will be able to continue to its closed position.

Once gate 17 is in its closed position, and assuming that pressure is higher at upstream seat 20 than at downstream seat 20, then coating 57 will come into contact with coating 73, and possibly inlay 69, thereby creating a seal that will prevent flow through the valve 11.

Since the shearing edge is formed by Stellite® inlays 39, the shear stresses will mainly be bom by that edge, thereby insulating the carbide coatings 57 and 73 from the high shear stresses developed by the shearing of the wireline 41. Since coatings 57, 73 will not have encountered the high shearing stresses, chipping of those coatings will not occur, and the sealing integrity of the seal will have been preserved.

The invention is advantageous because it allows for the shearing of large diameter thick-walled coiled tubing. The asymmetrical gate, having a shearing surface on one edge only, assures that no slug of the media is produced, which may fall into the valve cavity and adversely affect performance. The single rather than double shearing action permits tubing to be sheared by the downstream interface only. Such an action substantially reduces the force necessary to shear the media. Additionally, reversing the seat seal on the upstream side of the valve gate allows the upstream seat to seal in the event of damage to the downstream sealing surface.

While the invention has been particularly shown and described with reference to a preferred embodiment, it will be understood by those skilled in the art that various changes in form and detail may be made therein without departing from the spirit and scope of the invention.

We claim:

1. A gate valve comprising:

a valve body having an upstream passage, a downstream passage, and a central chamber therein; a gate having a hole therein, the gate being linearly movable within the chamber between a closed position blocking flow through the passages and an open position in which the hole registers with the passages;

upstream and downstream seat rings mounted in the chamber on opposite sides of the gate at intersections of the passages with the central chamber, each of the seat rings being located within a counterbore of one of the passages, the counterbore having a cylindrical wall and a base wall that is parallel to the gate, each of the seat rings having a cylindrical wall concentric with and spaced inward from the cylindrical wall of the counterbore and a base wall parallel to and spaced from the base wall of the counterbore, defining upstream and downstream seal ring cavities;

a shearing edge located on a leading edge of a downstream side of the hole for shearing a wireline as the gate closes, the hole having an upstream side that has a leading edge that trails the shearing edge to cause shearing of the wireline only with the shearing edge on the downstream side; and a seal ring located within each of the seal rings cavities, each of the seal rings having a pair of legs extending from a base of the seal ring, with one of the legs being in sealing engagement with the cylindrical wall of the counterbore and the other of the legs being in sealing engagement with the cylindrical wall of the seat ring, the legs of the seal rings in the upstream seal ring cavity extending in an upstream direction, and the legs in the downstream seal cavity extending in an upstream direction.

2. The gate valve of claim 1 further comprising:

a spring constrained between the base wall of each of the counterbores and each of the seat rings that biases each of the seat rings against the gate when in the closed position.

3. The gate valve of claim 1 further comprising an energizing ring having a protruding portion wedged between the legs of each of the seat rings, the energizing ring in the upstream seal ring cavity having a head portion in contact with the base wall of the counterbore of the upstream passage, the energizing ring in the downstream seal ring cavity having a head portion in contact with the base wall of the downstream seat ring.

4. The gate valve of claim 1 in which the hole is wider on the upstream side than on the downstream side, the hole having a first portion tapered at a first angle from the wider, upstream side, a second portion at a second angle extending from the first portion, and a third portion tapered at a third angle from the second portion to the narrower, downstream side of the hole, the second angle being greater, relative to a longitudinal axis of the passages, than the first angle.

5. A method of sealing a flow path comprising:

mounting a gate within a valve body having upstream and downstream seat rings, a central chamber and upstream and downstream passages extending co-axially therefrom in opposite directions, the gate having a hole therein;

mounting an upstream lip seal between the upstream seat ring and the valve body, the upstream lip seal having a pair of legs extending in an upstream direction;

moving the gate across the seat rings to a closed position;

sealing pressurized fluid in the upstream passage by urging the upstream seat ring against the gate and by pressing the gate against the downstream seat ring while the gate is in the closed position; and causing pressurized fluid in the upstream passage to enter between the legs of the upstream lip seal to energize the upstream seal ring and cause it to seal to prevent leakage of pressurized fluid from the upstream passage into the central chamber.

6. The method according to claim 5 further comprising:

mounting a downstream lip seal between the downstream seat ring and the valve body, the downstream lip seal having a pair of legs extending in the upstream direction; and should any of the pressurized fluid leak past the upstream lip seal into the central chamber, causing the pressurized fluid in the central chamber to enter between the legs of the downstream lip seal to energize the downstream seal ring and cause it to seal to prevent leakage of pressurized fluid from the central chamber into the downstream passage.

* * * * *

UNITED STATES PATENT AND TRADEMARK OFFICE
CERTIFICATE OF CORRECTION

PATENT NO. : 6,454,015 B1
DATED : September 24, 2002
INVENTOR(S) : John Taylor Armstrong et al.

It is certified that error appears in the above-identified patent and that said Letters Patent is hereby corrected as shown below:

Column 6,
Line 44, delete "born" and insert -- borne --

Signed and Sealed this

Eleventh Day of February, 2003

JAMES E. ROGAN
*Director of the United States Patent and Trademark Office*